United States Patent [19]
Baker

[11] 3,807,596
[45] Apr. 30, 1974

[54] FRY PAN UTENSIL

[75] Inventor: Robert A. Baker, Santa Barbara, Calif.

[73] Assignee: Aluminum Filter Company, Santa Barbara, Calif.

[22] Filed: May 19, 1972

[21] Appl. No.: 255,197

[52] U.S. Cl. .............................. 220/44 A, 55/384
[51] Int. Cl. ............................................ B65d 51/16
[58] Field of Search ............... 220/44 A, 95; 55/384

[56] References Cited
UNITED STATES PATENTS
3,452,895  7/1969  Kalkowski ..................... 220/44 A
2,770,389  11/1956  Drakoff ........................... 220/44 A OTHER PUBLICATIONS
Copy of Filter from Hanover House Catalog (Filter Fry Cover)

*Primary Examiner*—George T. Hall
*Attorney, Agent, or Firm*—Robert E. Geauque

[57] ABSTRACT

The utensil is to be located over the top of a heating vessel such as a frying pan to prevent splatter from the heating vessel wherein a dual aluminum screen assembly is employed which is connected through a circular rim, the circular rim having an upper substantially planar surface with a lower rounded surface, the rim having an internal cavity, the free ends of a wire stock handle cooperating within said cavity and being securely connected to said rim.

4 Claims, 3 Drawing Figures

PATENTED APR 30 1974
3,807,596
Fig. 1.
Fig. 3.
Fig. 2.
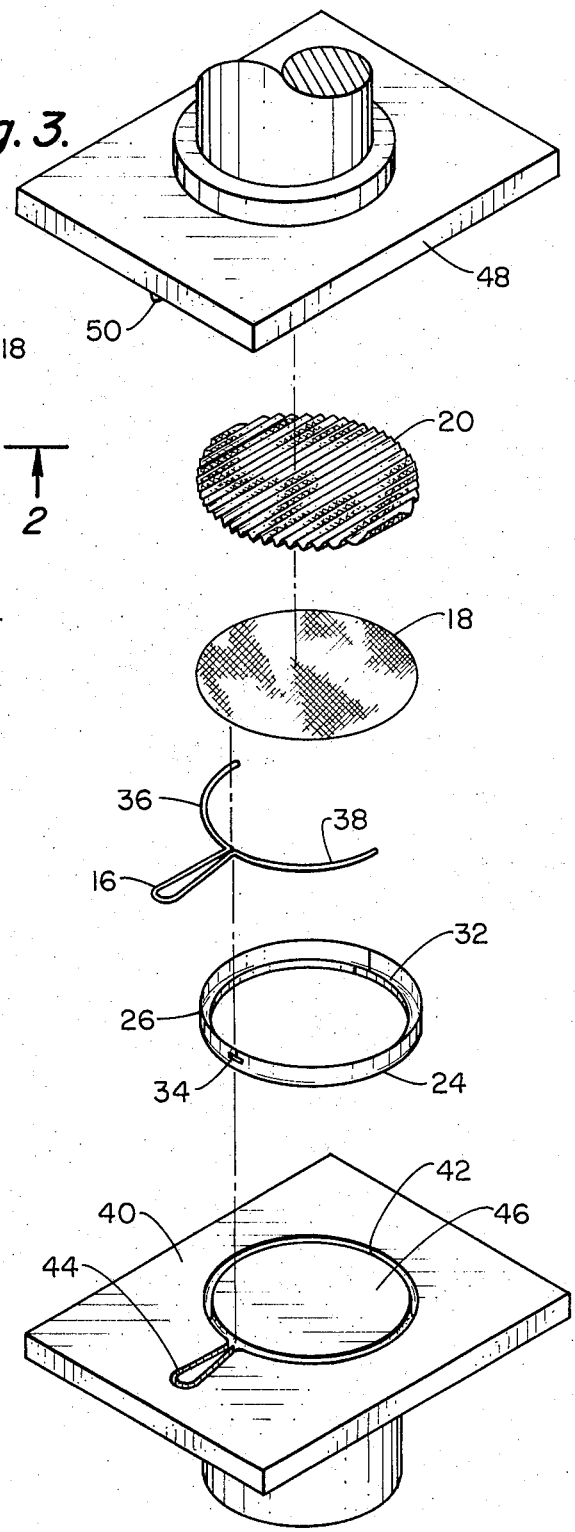
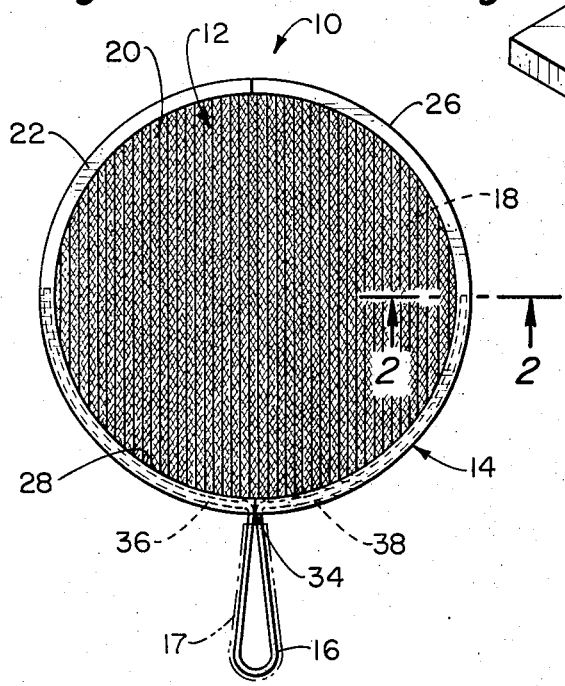
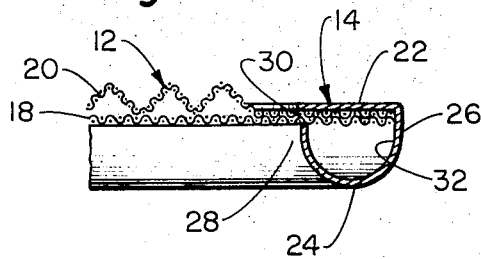

FRY PAN UTENSIL

BACKGROUND OF THE INVENTION

The field of this invention relates to a utensil for preventing splatter from cooking vessels such as frying pans, cooking pots, casseroles, or the like.

During the frying of foodstuffs within a cooking vessel, the water content which is inherently contained within those foodstuffs when coming into contact with the frying grease or oil results in a splattering of the hot grease exteriorly of the cooking vessel in a fine droplet form. This not only causes the surroundings to be soiled, but any person that is standing in the vicinity can suffer quite painful burns. One way in which this can be prevented is by placing a lid on the frying vessel. However, this has the disadvantage that saturated steam is then formed within the frying vessel and therefore the foodstuff in the vessel is steamed rather than fried, and no crust will be formed thereon. Thus, if the foodstuff is to be fried rather than steamed, one cannot counteract the above-mentioned splattering of grease by providing the frying vessel with a lid.

Previously it has been known to employ the use of a splatter screen over the cooking vessel. The splatter screen has an aperture size which is small enough to prevent the grease droplets from escaping through the screen but the apertures are large enough to permit the steam to escape. Therefore, with the use of such a screening material the foodstuff is properly fried rather than steamed.

Many of the screens of the prior art employ the use of a ring element centrally located within the screen to facilitate the manual location and removal of the screen. However, this central ring element tends to become quite soiled during use and also tends to become rather hot. Therefore, a person removing the screen after use will soil his hands as well as possibly incurring a burn. Additionally, the ring may frequently fall against the screen making the grasping of the ring difficult.

The manufacture of such cooking utensils is an extremely competitive business. If one manufacturer can manufacture such a utensil at a lesser cost, a significantly competitive advantage is achieved. Such utensils of the prior art have been quite complex in construction which therefore significantly increases the manufacturing cost.

SUMMARY OF THE INVENTION

The utensil of this invention employs the use of a dual screening assembly comprising a first layer and a second layer. The first layer is substantially planar and the second layer being corrugated. The screening assembly is then secured within a circular rim. The circular rim has a rounded lower surface and a planar upper surface. The rim includes an internal cavity. The periphery of the screening material is located in a space between the upper surface and the lower surface of the rim prior to the forming operation. Force is to be applied to the upper surface of the rim resulting in the deforming of the lower surface within a mold cavity resulting in a closing of the space and a binding of the screening assembly between the upper surface and the lower surface. A wire stock handle is to be located through an aperture in the rim and into cooperation with the cavity. During the forming operation this handle is secured to the rim.

BRIEF DESCRIPTION OF THE DRAWING

FIG. 1 is a plan view of the utensil of this invention;

FIG. 2 is a cross-sectional view through the utensil of this invention taken on line 2—2 of FIG. 1; and FIG. 3 is an exploded isometric view depicting the molding structure to form the utensil of this invention.

DETAILED DESCRIPTION OF THE SHOWN EMBODIMENT

Referring particularly to the drawing, there is shown the utensil 10 of this invention being composed basically of a screening assembly 12 which is secured within a rim 14 and a handle 16. The screening assembly 12 is composed of a first layer 18 and a second layer 20. Each of the layers 18 and 20 is to be formed of the same material of construction and it is envisioned that the material of construction will be aluminum. Aluminum is particularly desirable because of its inherent resistance to rust.

The first layer 18 is formed in substantially a single plane and includes a plurality of small elongated apertures. The second layer 20 is formed in a corrugated manner having a series of closely spaced apart ridges. The apertures in the second layer are formed substantially similar to the apertures in the first layer, being somewhat elongated and approximately the same size. The first layer 18 and second layer 20 are placed together so that the elongated dimension of the apertures between the layers are substantially transverse to one another. This particular arrangement is found to be desirable as steam is readily passed therethrough but droplets of grease are prevented from being passed therethrough.

The rim 14 is composed basically in the circular configuration and has an upper surface 22 and a lower surface 24 which are connected together through an outside edge 26. The inside edge 28 includes a space 30 separating the upper surface 22 from the lower surface 24. The rim 14 is to be constructed of a hard material with aluminum also being quite satisfactory.

Within the rim 14 there is a space between the upper surface 22 and the lower surface 24 which defines a cavity 32. An aperture 34 is formed within the outside edge 46 and provides access into the cavity 32. The handle 16 preferably is to be formed of an aluminum wire stock material and includes a pair of spread apart free ends 36 and 38. The length of the ends 36 and 38 are to be fixed so that they extend approximately one-half of the circumference of the rim 14. The ends 36 and 38 are to be conducted through the aperture 34 and communicate within the cavity 32. The diameter of the wire handle 16 is to be selected so as to be snugly retained within the cavity 32. It is desirable to apply an insulative material 17 about the wire handle 16. This protects the user against injury by the handle becoming heated during use.

Referring particularly to FIG. 3 of the drawing, the forming of the utensil 10 of this invention is depicted. The rim 14 is shown prior to forming with the space 30 being about a quarter of an inch. A lower mold element 40 is employed which includes therein a mold cavity 42. The mold cavity 42 is formed substantially circular in the shape of the rim 14 and also includes a mold cavity 44 for the handle 16. The screening assembly 12, which has been previously cut to the desired size and with the layers 18 and 20 arranged as previously mentioned, is located upon raised area 46 of the lower mold element 40. The rim 14 is then located within the mold cavity 42 with the periphery of the screening assembly located within the space 30. The handle 16 is also placed within the mold cavity 44 with the free ends 36 and 38 passing through an aperture within the edge 26 of the rim 14 so that the free ends 36 and 38 communicate within the mold cavity 42 and actually lie within the cavity 32.

An upper mold element 48 is then caused to come into contact with the upper surface 22 applying sufficient force to tent to compress the rim 14 between the upper mold element 48 and the lower mold element 40. The compression force is to be sufficient so as to cause the lower surface 24 to deform and in essence roll within the mold cavity 42 resulting in a closing of the space 30. As a result, the screening assembly 12 is bound between the lower surface 24 and the upper surface 22 as shown in FIG. 2 of the drawing. This closing of the space 30 decreases the volume of the cavity 30 which results in a frictional binding of the ends 36 and 38 of the handle 16, thereby securing the handle to the rim 14.

The portion of the outside edge about the aperture 34 during the forming operation is normally caused to be deflected outwardly along the handle 16. To avoid this a protuberance 50 is formed upon the upper mold element 48 with the protuberance 50 being adapted to come into contact with the edge 26 directly adjacent the aperture 34. This causes the metal in this area to be pushed inwardly into the rim thereby eliminating an unsightly appearance.

The upper mold element 48 is then removed out of contact with the surface 22 and the entire utensil 10 of this invention is extracted from the mold cavities 42 and 44. The device is then ready to be used without any further manufacturing operations.

The handle 16 facilitates the manipulation of the utensil 10 while being used, makes it easy to place upon a cooking vessel and remove such from the cooking vessel after use. Also, the handle 16 is not directly in the heating stream and therefore the handle is free from being soiled with grease and also does not become heated. Handle 16 also facilitates manipulation of the utensil 10 while it is being cleaned.

I claim:

1. A utensil to prevent splatter from a fry pan during cooking comprising:

a screen assembly;

a circular rim located about and secured to said screen assembly, said rim having an internal cavity, said circular rim having a substantially planar upper surface and a substantially rounded lower surface, the edge of said lower surface facing said planar upper surface and effecting a binding of said screen assembly therebetween; and a handle formed of wire stock, the free ends of said handle snugly retained within said cavity of said rim.

2. The utensil as defined within claim 1 wherein:

said screen assembly comprises a first screening layer and a second screening layer.

3. The utensil as defined within claim 2 wherein:

said first screening layer being substantially planar in configuration, said second screening layer being substantially corrugated in configuration.

4. The utensil as defined in claim 3 wherein:

both said first screening layer and said second screening layer having a mesh of elongated apertures, the longitudinal dimension of said apertures of said layers are substantially transverse to one another.

* * * * *